Figure 1:
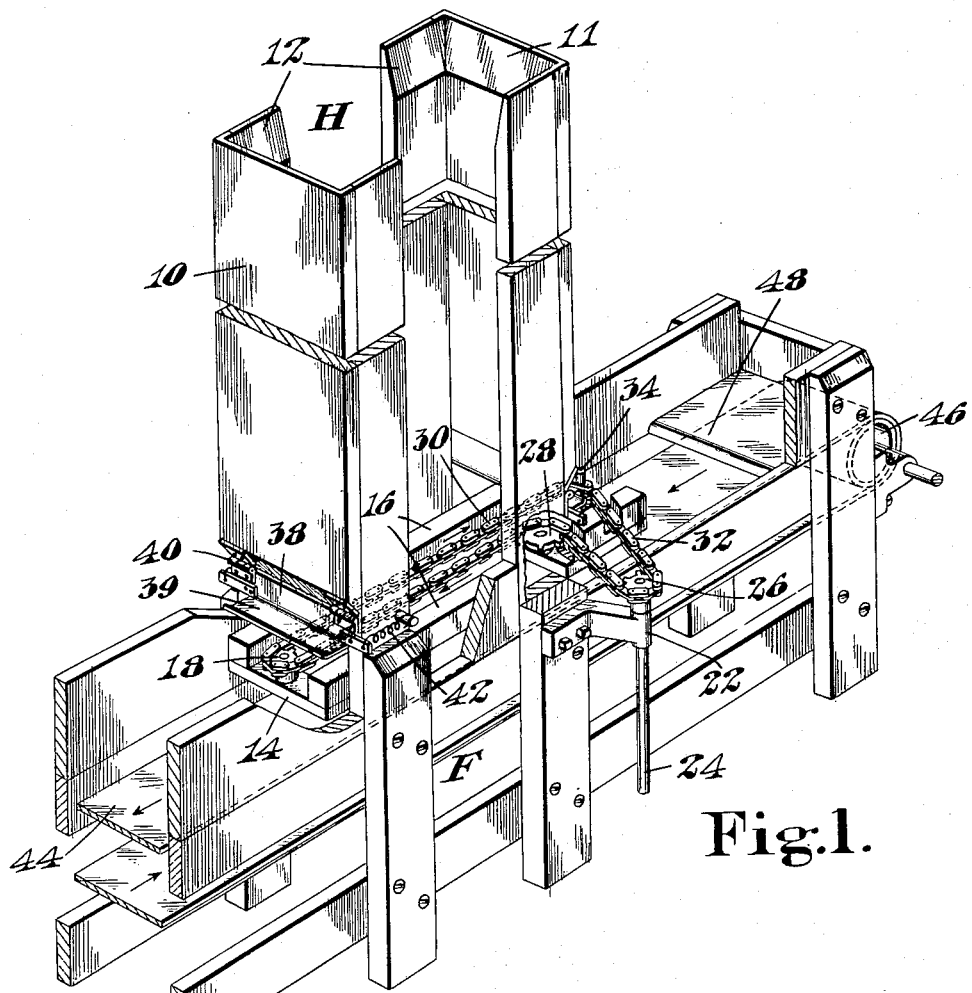

Jan. 16, 1934.  C. D. KNOWLTON  1,943,444
APPARATUS FOR SEPARATING ARTICLES
Filed April 21, 1932

INVENTOR
Cutler D. Knowlton
By his Attorney
Harlow M. Davis

Patented Jan. 16, 1934

1,943,444

UNITED STATES PATENT OFFICE 1,943,444

APPARATUS FOR SEPARATING ARTICLES

Cutler D. Knowlton, Beverly, Mass., assignor to Hoague-Sprague Corporation, Lynn., Mass., a corporation of Massachusetts Application April 21, 1932. Serial No. 606,606

18 Claims. (Cl. 198—35)

This invention relates to article-separating apparatus, as that by which nested boxes or box-parts are removed one by one from a nested series. Another form of such an apparatus is presented in the application for Letters Patent of the United States Serial No. 579,041, filed in my name on December 4, 1931.

Makers of boxes and box-covers, such as may be employed for enclosing pairs of shoes, frequently hold these in stock stacked or nested in series in which the successive box-parts are alternately inclined in opposite directions. When sent to the users they are separated and the covers applied to the boxes for packing. An object of my invention is to effect this separation, and the delivery of the thus-separated parts to an operator, rapidly and accurately by a simple organization. For this purpose there is combined in a novel manner with an article-holding conduit or other means for supplying articles from a series, continuously traveling means movable in cooperation with the supplying means in opposite directions and provided with an article-engaging surface, the same surface having separating engagement with the articles during movement in both directions. The separating means is preferably furnished by a member in the form of a projection from such an endless device as a chain. With this endless device operating over opposite guide members situated outside the holder, the projection is caused to move alternately in opposite directions in separating engagement with articles supported in the holder, these articles being thereby caused to leave the holder at opposite sides as through openings in the holder-walls. This delivery from the series may be effected at a high speed, the articles being successively withdrawn from those above them, which are retained against displacement by the walls of the holder. To prevent clogging by irregularities in the articles or in their nesting, portions of the walls adjacent to the delivery-openings of the holder are made yieldable, they normally resisting displacement but giving upon the application of excessive pressure applied by contact of an article in the series succeeding the one being separated. To facilitate the delivery of the separated articles to an assembler and packer, a conveyor is best associated with the holder or supplying means, traveling beneath it. Since the articles are oppositely delivered, their regularity upon the conveyor may be interfered with. For example, every other article will be ejected in the direction of conveyor-travel and the alternate articles oppositely thereto. This, unless means were taken to prevent it, would make irregular the delivery to the assembler and packer or would change the sequence. I may equalize the delivery by making the time required for movement of the separating means greater in one direction than in the opposite direction. With the endless separating device, this is effected conveniently by making the distance through which one of its runs travels at one side of the holding or supplying means greater than that through which the opposite run is guided, a loop being formed at that side by the positions of the guiding members. With opposite delivery to a traveling conveyor, the article moving against the conveyor-advance might be pushed back and prevented from falling or be injured by the rubbing action upon it. I have, therefore, shown means contacting with the articles separated and delivered in one direction for reversing the end which falls upon the conveyor. This means may take the form of a support above the conveyor spaced from the separating means so an opening is created into which the reversed articles fall, contacting with the conveyor in the direction of its movement. The supporting means is arranged to act upon the articles delivered by the separating means during its shorter time of travel.

In the accompanying drawing appears an illustrative embodiment of my invention. In this drawing, Fig. 1 is a broken perspective view of the apparatus; and Fig. 2 a partial vertical longitudinal section therethrough.

Rising from a frame F is a holder or conduit H through which may be supplied a series of articles, shown as box-covers B, though they might equally well be boxes and will hereinafter be referred to as such. These boxes are nested one within another and are alternately oppositely inclined, the successive boxes having their opposite ends differently disposed, the right end of one and the left of the next in the series (Fig. 2) being between the walls of the next below them, while the other ends, respectively to the left and right, are above such walls. The holder may consist of spaced vertical end walls 10 and 11 each having at their outer edges and extending toward the opposite wall retaining flanges 12, 12 between which the boxes descend. Lying across the frame are bars 14, 14 and upon these, extending longitudinally of the frame, are bars 16, 16 situated beneath the holder H and upon which the series of boxes B is supported, the sides of the terminal box resting on them. Rotatable on each of the cross-bars 14, between the supporting bars 16 and about vertical axes, are sprocket-wheels 18 and 20, each of these being sufficiently removed from the holder to be outside the path of the descending boxes. Journaled in a bracket 22 at one side of the frame is a shaft 24, driven by means not illustrated from a source of power. At its upper extremity this shaft has fixed upon it, at one side of the holder H, a sprocket-wheel 26. Still another sprocket-wheel 28 is shown, this being rotatable about a vertical axis situated inwardly from the wheel 20 toward the holder. Guided by the wheels, as appears in Fig. 1 of the drawing, is an endless sprocket-chain 30 which is caused to travel continuously by the rotation of the wheel 26. It moves in substantially horizontal planes just below the supporting surfaces of the bars 16, extending in parallel runs beneath the holder. These runs pass outside the walls 10 and 11, directly from wheel 18 to wheel 20, while the companion run is diverted in a loop 32 about the driving wheel 26, so it is offset from the direct path of the chain between the wheels 18 and 20. Rising from one of the links of the chain 30 is a pin or projection 34, the upper end of which lies somewhat above the supporting surface of the bars 16. At the lower extremity of each of the walls 10 and 11 is an opening 36, which may extend for the full width of the wall and be of a height substantially equal to the depth of the boxes, just permitting the passage of one of said boxes therethrough. Above each opening 36 the corresponding wall has a yieldable portion 38, pivoted at 40 and normally held in a vertical position by a spring 42. A horizontal extension 39 from each wall-portion 38 furnishes, with the supports 16, a throat through which the boxes emerge from the holder.

Figure 2:
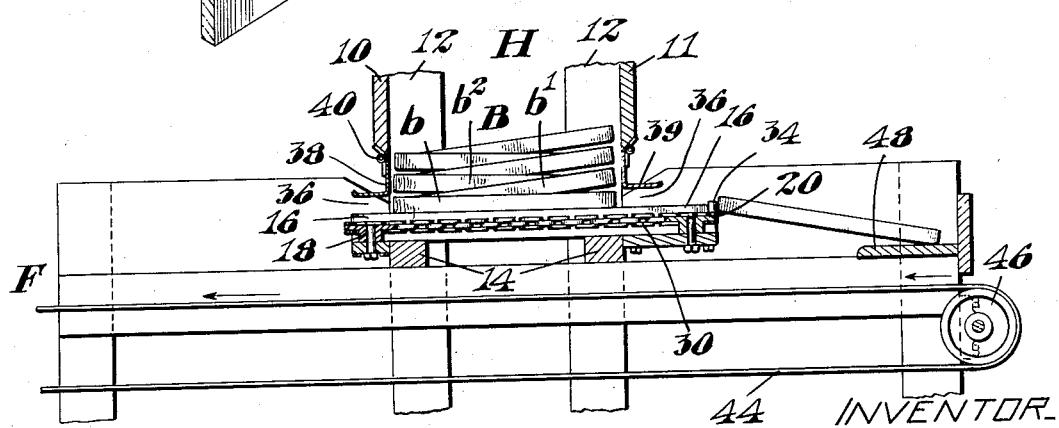

Under the influence of the chain-travel, the pin 34, from the position illustrated in Fig. 1 in which it has just come from beneath the holder, is carried idly along the loop 32 about the wheel 26 and then back to the holder under which it passes. In so doing it engages the terminal box $b$ of the series which is resting upon the bars 16 and displaces this from the box $b^1$ above it. The stack is so placed in the holder that the extremity of the second box is above that engaged and offers no positive resistance to separation, yet the frictional drag of the latter might tend to carry the former with it, but the second box has within its elevated end a third box $b^2$ and this, at its upper end, is retained by contact with the wall-portion 38, so only the terminal-box is moved by the pin and is carried out of the opening 36 in the wall 10. When there are no irregularities in the form or nesting of the boxes, those above the one engaged by the pin are properly retained by the wall 10, but if for any reason clogging occurs which might cause injury, the wall-portion 38 yields and releases the resisting boxes and then returns to its normal position, causing no interruption in the delivery. The ejected box $b$ falls from the bars 16 upon a conveyor or other forwarding means 44, which may consist of an endless belt traveling beneath the holder over a roll 46 and a distant roll, not illustrated. To the shaft of one of these rolls power may be applied. The conveyor may deliver to an assembling and packing station. After the delivery of the box $b$ the pin 34 turns about the wheel 18 and returns below the holder. In doing this it engages the box $b^1$, which the descent of the stack after the removal of the box $b$ has brought on the bars 16. The action is as before, except that the ejected box bridges a space between the holding and separating means and a support 48 lying transversely at this end of the frame F below the supporting plane of the bars 16. The holding up by the support 48 of the forward end of the box $b^1$ causes the rear extremity to strike the belt, thus reversing the direction in which it left the holder. Said belt is traveling in the direction opposite to that of the ejection of the box at this side of the holder. Therefore, the reversal of said box avoids projecting its forward extremity against an oppositely moving surface and thus forcing it back against the chain or the adjacent elements or the possible scuffing and marring of the cover-paper. A complete cycle involving the opposite double delivery has now been completed, and these cycles continue automatically as long as boxes are kept supplied in stacks to the holder. It is to be noted that when a box is delivered from the opening in the wall 10 it is moving with the conveyor, while delivery through the opening in the wall 11 is against the travel of the conveyor. With the intervals between the engagement of the pin 34 with the opposite ends of succeeding boxes the same, these would either be un-uniformly spaced upon the conveyor, disturbing the operating rythm of the assembling and packing operator, or the sequential delivery to the conveyor. I may, if it seems desirable, correct this effect of opposite delivery by a difference in the length of the opposite runs of the chain, this being introduced by the loop 32. Because of this loop, the pin will take a longer time in progressing from the wheel 20 to the wheel 18, in ejection of a box in the direction of the conveyor-travel, than from the wheel 18 to 20, acting against the conveyor. The length of the opposite chain-runs may be so chosen as to lead to a substantially equal spacing of the boxes upon the conveyor.

Having described my invention, what I claim as new and desire to secure by Letters Patent of the United States is:

1. In an apparatus for separating articles from a series, means for supplying a series of articles, and continuously traveling means movable in cooperation with the supplying means in opposite directions and provided with an article-engaging surface, the same surface having separating engagement with the articles during movement in both directions.

2. In an apparatus for separating articles from a series, means for supplying a series of articles, means movable in cooperation with the supplying means in opposite directions in separating engagement with the articles, means acting upon the separating means to cause the time of its movement in one direction to exceed that of its movement in the opposite direction, and a conveyor to which the separating means delivers the articles in substantially uniformly spaced relation.

3. In an apparatus for separating articles from a series, means for supplying a series of articles, a member movable transversely of the supplying means, means for moving the member alternately in opposite directions in separating engagement with successive articles of the series, said member traveling in a substantially horizontal plane throughout, and supports for the articles extending beneath the series from opposite sides of the supplying means and leaving an intermediate space through which the separating member travels.

4. In an apparatus for separating articles from a series, a conduit having openings at opposite sides and yieldable wall-portions adjacent to the openings, and means movable in engagement with the articles in the conduit to eject the articles through the openings, the yieldable wall-portion being movable by an article in the series succeeding the one being ejected.

5. In an apparatus for separating articles from a series, means for supplying a series of articles, an endless device movable across the supplying means and having a portion arranged for separating engagement with the articles, and means arranged to guide one run of the endless device through a distance greater than that through which the opposite run is guided, both of said runs being effective to carry the separating portion into engagement with the articles.

6. In an apparatus for separating articles from a series, a holder for the series of articles, an endless device movable throughout in a substantially horizontal plane and carrying article-engaging means for successive engagement with and removal of articles from said holder during opposite directions of movement of the engaging means, guide members for the endless device situated at opposite extremities of the holder and guiding the working runs of the endless device, and a driving member for the endless device laterally offset from the working runs thereof.

7. In an apparatus for separating boxes from a nested series, a substantially vertical holder for a series of boxes, sprocket-wheels rotatable at opposite extremities at the bottom of the holder, a chain operating over the wheels and having a projection, and means for mounting the chain for movement of the projection in an approximately horizontal plane, whereby said projection is movable in engagement with the opposite walls of alternate boxes.

8. In an apparatus for separating boxes from a nested series, a substantially vertical holder for a series of boxes, sprocket-wheels rotatable at opposite extremities at the bottom of the holder, a chain operating over the wheels and having a projection, means for mounting the chain for movement of the projection in an approximately horizontal plane, whereby said projection is movable in engagement with the opposite walls of alternate boxes, and substantially horizontal supports for the series of boxes situated beneath the holder at opposite sides of the chain.

9. In an apparatus for separating boxes from a nested series, a substantially vertical holder for a series of boxes, sprocket-wheels rotatable at opposite extremities at the bottom of the holder and at one side thereof, and a chain operating over the wheels and having a projection guided by the sprocket-wheels in an approximately horizontal plane, whereby said projection is movable in engagement with the opposite walls of alternate boxes.

10. In an apparatus for separating boxes from a nested series, a substantially vertical holder for a series of boxes, said holder having opposite walls provided with yieldable portions at the lower extremities, sprocket-wheels rotatable outside the yieldable portions of the walls, and a chain operating over the wheels and having a projection guided by the sprocket-wheels in an approximately horizontal plane, whereby said projection is movable into engagement with the opposite walls of alternate boxes.

11. In an apparatus for separating articles from a series, means for supplying a series of articles, means movable in cooperation with the supplying means in opposite directions in separating engagement with the articles, a conveyor traveling beneath the supplying means to receive separated articles and a stationary member supporting the leading extremities of the articles separated in one direction while their opposite extremities fall upon the conveyor.

12. In an apparatus for separating articles from a series, means for supplying a series of articles, means movable transversely of the supplying means in opposite directions in separating engagement with the articles, an article-receiving conveyor traveling beneath the supplying means, and means supporting the leading extremities of the articles upon their delivery by the separating means in one direction while their opposite extremities fall upon the conveyor.

13. In an apparatus for separating boxes from a nested series, a substantially vertical holder for a series of boxes, a member movable alternately in opposite directions in separating engagement with the successive boxes in series, a conveyor traveling beneath the holder to receive separated boxes, and a support above the conveyor at one side only of the holder, to which support the boxes separated in one direction are delivered for transfer to the conveyor.

14. In an apparatus for separating boxes from a nested series, a substantially vertical holder for a series of boxes, a member movable alternately in opposite directions in separating engagement with the successive boxes in series, a conveyor traveling beneath the holder, and a support for the separated boxes above the conveyor at one side of the holder, there being a space between the support and separating member into which may fall the inner portions of the boxes from the support.

15. In an apparatus for separating articles from a series, means for supplying a series of articles, means movable in cooperation with the supplying means in opposite directions in separating engagement with the articles, the time required for movement in one direction being greater than that for movement in the opposite direction, an article-receiving conveyor traveling beneath the supplying means, and means contacting with the articles separated during the shortest time of travel and arranged to reverse their movement on to the conveyor.

16. In an apparatus for separating boxes from a nested series, a substantially vertical holder for a series of boxes, sprocket-wheels rotatable at opposite extremities of the bottom of the holder and at one side of one extremity, a chain operating over the wheels and diverted in a loop over said wheels and having a projection movable into engagement with the opposite walls of alternate boxes, a conveyor traveling beneath the holder, and a support for the extremities of the separated boxes, said support being located above the conveyor at the side of the holder at which the chain is looped.

17. In an apparatus for separating articles from a series, means for supplying a series of articles, an endless device movable across the supplying means with its opposite runs lying in the same horizontal plane and having a portion arranged for separating engagement with the articles during travel in opposite directions, and guide members for the device movable about vertical axes outside the supplying means.

18. In an apparatus for separating articles from a series, means for supplying a series of articles, an endless device movable across the supplying means, and guide members for the device movable about vertical axes outside the supplying means, said device extending between the guide members in opposite runs at substantially the same level, the device having a separating projection traveling with the opposite runs into engagement with the opposite ends of succeeding articles in the series.

CUTLER D. KNOWLTON.